F. T. NEWBERY.
Processes and Apparatus for Supplying Cities
with Milk.

No. 148,620. Patented March 17, 1874.

Witnesses
John L. Borne
C. M. Richardson

Frederick T. Newbery
per Dewey & Co.
Attys

AM. PHOTO-LITHOGRAPHIC Co. N.Y. (OSBORNE'S PROCESS.)

UNITED STATES PATENT OFFICE.

FREDERICK T. NEWBERY, OF SAN FRANCISCO, CALIFORNIA.

IMPROVEMENT IN PROCESSES AND APPARATUS FOR SUPPLYING CITIES WITH MILK.

Specification forming part of Letters Patent No. 148,620, dated March 17, 1874; application filed May 17, 1873.

*To all whom it may concern:*

Be it known that I, FREDERICK T. NEWBERY, of San Francisco city and county, State of California, have invented an Improved Process and Apparatus for Supplying Milk from great distances; and I do hereby declare the following description and accompanying drawings are sufficient to enable any person skilled in the art or science to which it most nearly appertains, to make and use my said invention or improvement, without further invention or experiment.

My invention relates to an improved process and apparatus for supplying cities and other places with milk in quantity, so as to avoid the jolting or churning operation of conveying it in cans which are carried in carts and wagons, and by which its quality is greatly deteriorated. My plan also provides a means of transmitting milk between two points at long distances apart, so that fresh milk can be furnished at depots in cities at a much less cost than where it is carted in the usual manner.

In order to explain my invention so that others will be able to understand its operation, reference is had to the accompanying drawing, forming a part of this specification, in which—

Figure 1:
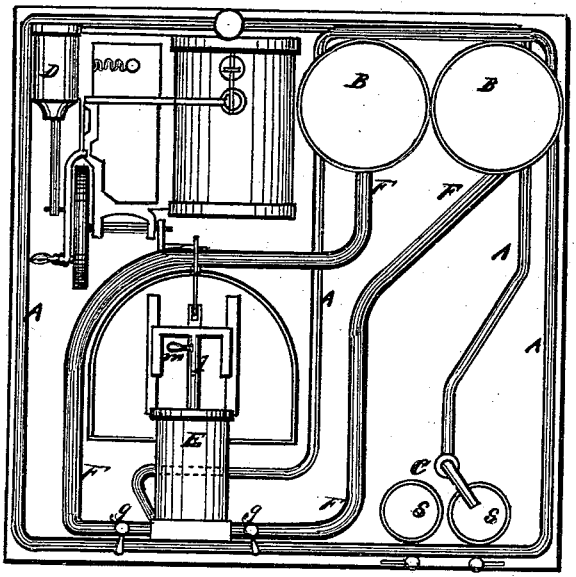
Figure 2:
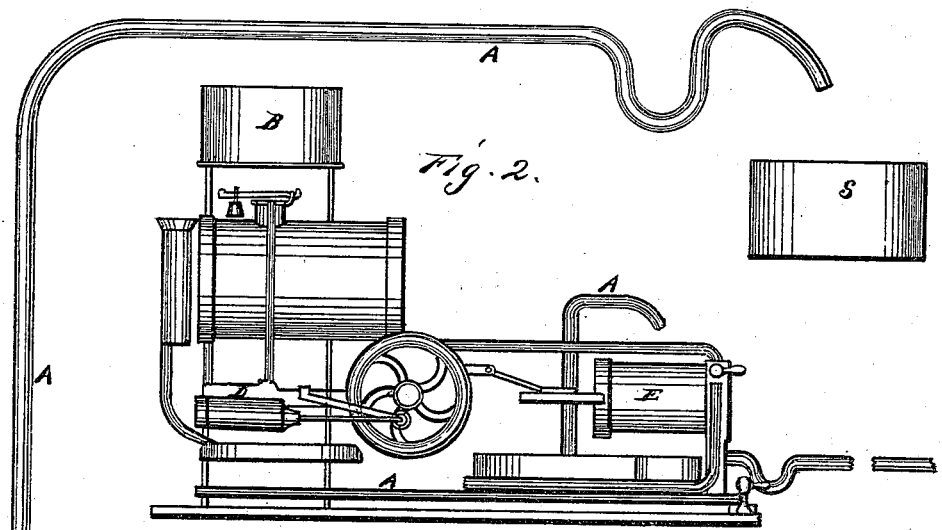
Figure 3:
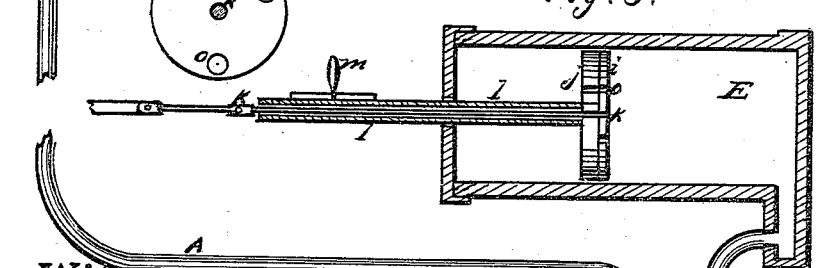

Figure 1 is a plan or top view of my apparatus. Fig. 2 is a side elevation. Fig. 3 is a section of the pump.

A represents a pipe, which can be made of any non-oxidizing substance. This pipe I propose to lay between the two sections in the manner of laying ordinary water-pipe, either above or under ground or water, as convenient. Let B B represent the supply-tanks, one of which is filled with milk and the other with water. C is the delivery-station. D is a steam-pump of any suitable kind, and E, is the pumping-cylinder. Pipes F connect the bottoms of the tanks B B with the pumping-cylinder E at one end, one upon each side, while the conveying pipe or tube A communicates with the bottom of the cylinder. A cock, $g$, in each of the pipes F, serves to admit or shut off the water or milk from the cylinder as it is required, and valves inside the pipes serves to direct the liquid in the usual way. The piston-head, which operates in the cylinder E, is made of two disks, $i\,j$. The disk $i$ is stationary, being fixed to the end of the piston-rod $k$, and is perforated with one or more holes, $o$, while the disk $j$ is secured to the end of a sleeve, $l$, which surrounds the piston-rod, and has a lever-handle, $m$, outside of the cylinder. The disk $j$ is also provided with one or more holes, which correspond with the holes in the disk $i$.

When the disks are shifted, so that the holes alternate, the piston acts as a solid piston; but, when the disk $i$ is turned so as to bring the holes opposite each other, the piston will be rendered inoperative without stopping the engine.

The pipe is kept continually filled with water when not in use for transmitting milk or other liquid.

At the time of starting the milk or other liquid through the pipe, a signal will be given or sounded at the delivery-station by suitable means, so as to draw the attention of the attendant. The milk is then admitted to the pump-cylinder, and is forced through the pipe A, and delivered into the tank S at the delivery-station, the water in the pipe being expelled by the milk or other liquid as it enters. When the supply of milk has been exhausted, water is turned on from the water-tank, and the pumping is continued until the water expels the milk from the pipe. The pumping is then discontinued until a fresh supply of milk is ready to transmit, the pipe remaining filled with water during the interim, thus preventing the access of atmospheric air.

By this arrangement, I am able to supply cities with milk from long distances, so that it can be furnished in larger quantities and at cheaper rates than by the present plan; and, by keeping the pipes continually filled with either water or the liquid being transmitted, air is kept excluded from the pipe, and oxidation and acidulation prevented.

The milk or other liquid being constantly under pressure while in the pipe, its particles will remain unchanged in position, thereby preventing the cream from separating and rising to the top, as it would do in case it were not under pressure; and the movement of the milk through the pipe being a steady and uniform sliding motion, without agitation, the tendency to form butter is avoided.

Having thus described my invention, what I claim, and desire to secure by Letters Patent, is—

The combination of the tanks B B, pipes F F, force-pump E, and conveying-pipe A, all constructed and operating substantially as and for the purpose set forth.

In witness whereof I hereunto set my hand and seal.

FREDERICK THOMAS NEWBERY. [L. S.]

Witnesses:
    JOHN L. BOONE,
    C. M. RICHARDSON.